UNITED STATES PATENT OFFICE.

HENRY C. TAYLOR, OF GILMER, TEXAS.

INSECTICIDE.

No. 882,724.

Specification of Letters Patent.

Patented March 24, 1908.

Application filed October 23, 1907. Serial No. 398,781.

*To all whom it may concern:*

Be it known that I, HENRY C. TAYLOR, a citizen of the United States, residing at Gilmer, in the county of Upshur and State of Texas, have invented certain new and useful Improvements in Insecticides, of which the following is a specification.

This invention is a composition of matter for killing insects, and is particularly useful for destroying the cotton boll weevil. These weevils are usually found inside the cotton boll or "square", and the object of the present invention is to provide a compound which will penetrate the square and kill the weevil inside the same or wherever it reaches the insect. The composition may also be used to advantage for destroying other insects.

The composition is made of the following ingredients in the proportions or quantities stated: one ounce of oil of sassafras; one half dram of magnesia sulfate; one half ounce of prepared chalk; to which, after being mixed thoroughly, is added one gallon of water.

The oil of sassafras is the active ingredient. The sulfate of magnesia is to cut or disperse the oil and give the compound greater power of penetrating or entering the square; and the chalk is to cause the compound to adhere the better to the plant when sprinkled thereon.

The composition will be found very efficient for the purpose intended. It is applied by spreading or sprinkling on the plants in sufficient quantity to produce the desired result.

I claim:

An insecticide consisting of a mixture of oil of sassafras, sulfate of magnesia, chalk and water.

In testimony whereof I affix my signature, in presence of two witnesses.

HENRY C. TAYLOR.

Witnesses:
J. R. WARREN,
T. H. BRIGGS.